O. L. DORR.
Improvement in Washing Machines.
No. 121,598. Patented Dec. 5, 1871.

Witnesses:
E. Wolff.
Francis McArdle.

Inventor:
O. L. Dorr
PER
Attorneys.

UNITED STATES PATENT OFFICE.

OSCAR L. DORR, OF SOUTH WALPOLE, MASSACHUSETTS.

IMPROVEMENT IN WASHING-MACHINES.

Specification forming part of Letters Patent No. 121,598, dated December 5, 1871.

*To all whom it may concern:*

Be it known that I, OSCAR L. DORR, of South Walpole, in the county of Norfolk and State of Massachusetts, have invented a new and Improved Washing-Machine; and I do hereby declare that the following is a full, clear, and exact description thereof, which will enable others skilled in the art to make and use the same, reference being had to the accompanying drawing forming part of this specification.

Figure 1:
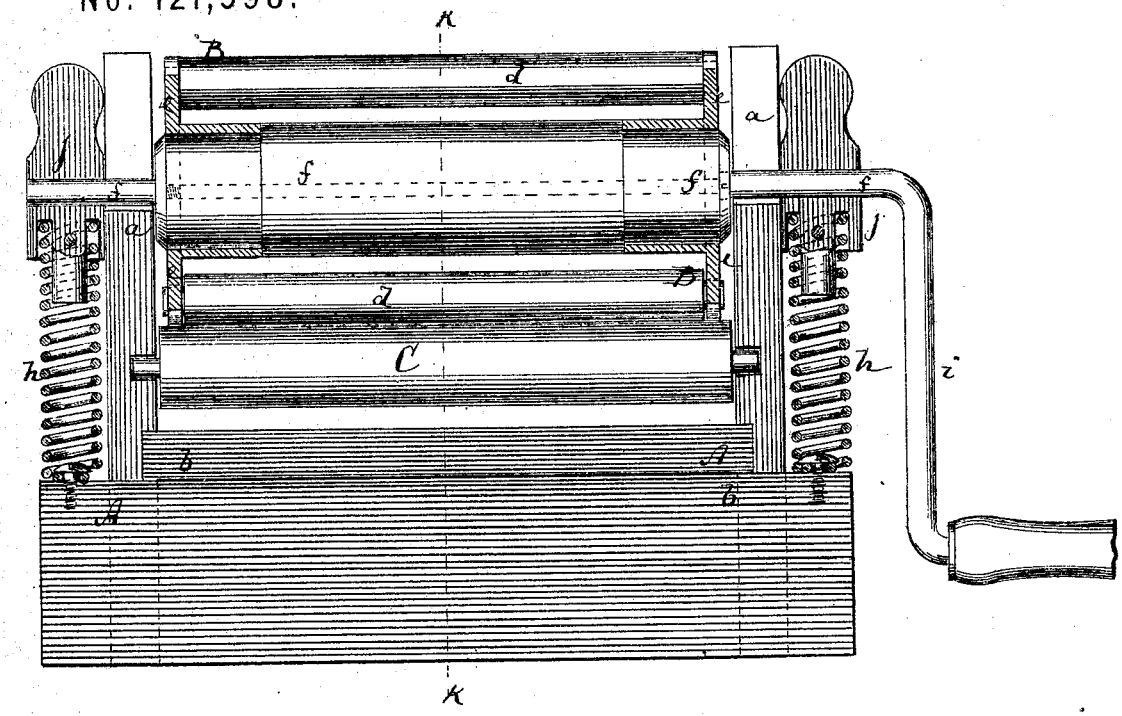
Figure 2:
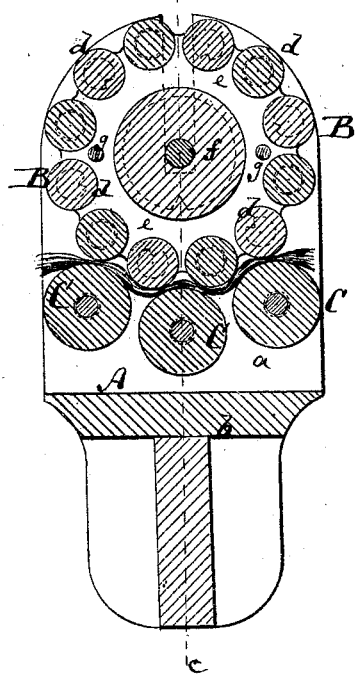

Figure 1 represents a longitudinal vertical section of my improved washing-machine, the line $c\ c$, Fig. 2, indicating the plane of section. Fig. 2 is a vertical transverse section of the same on the line $k\ k$, Fig. 1.

Similar letters of reference indicate corresponding parts.

My invention consists in the improvement of washing-machines, as hereinafter fully described and subsequently pointed out in the claim.

A in the drawing represents the frame of my improved washing-machine, consisting of two end uprights or posts, $a\ a$, which are, at their lower ends, connected by a longitudinal beam, $b$. In the upper part of the frame A are the bearings of the multiple roller B. The same is composed of a series of rods, $d\ d$, twelve being shown in Fig. 2, which are arranged in a circle around the axis of B. The ends of the rods $d\ d$ are fitted into sockets provided for their reception in metallic head plates $e\ e$. These head or end plates are mounted upon a central axle, $f$, and further connected by screw-rods $g$. The rods $d\ d$ are so fitted into the head plates that every other rod is free to revolve on its own axis, the remainder being rigidly secured. The axle $f$ is continued beyond the head plates $e$ and has its bearing in the upright of the frame A. Its ends are connected with springs $h\ h$, which tend to draw it down, and with it the entire roller B. C C are three plain rollers hung in the frame A under the multiple roller B. The springs crowd the latter down upon the plain rollers. The fabrics to be washed are placed between the roller B and C, and rotary motion is then imparted to the latter by means of a crank-handle, $i$, so that the rods and rollers $d$ will be successively brought into contact with the fabric, and by the spring carried forcibly against the same. The connection of the springs $h$ with the bearings $j$ of the axle $f$ is peculiar. These bearings are made in form of cylindrical blocks with an annular recess cut into their lower ends. The spring enters this recess, thus embracing the pendent plug and is fastened by a nail or pin driven through the block $j$ and one of the convolutions of the spring. The lower end of each spring is secured to the base A by a screw or pin. Slotted or forked cleats are secured to the side of the tub to which this machine is to be applied, the base piece of the frame A fitting into these cleats and being thereby securely held in place.

Having thus described my invention, I claim as new and desire to secure by Letters Patent—

The combination, with frame A $a$, rolls C, and alternately-rotating rods $d$, of the axle $f$, having its bearings arranged in blocks provided with springs $h\ h$, as and for the purpose set forth.

OSCAR L. DORR.

Witnesses:
J. N. SMITH,
C. E. DORR.